(12) United States Patent
Lo

(10) Patent No.: US 6,842,481 B1
(45) Date of Patent: Jan. 11, 2005

(54) APPARATUS AND METHOD FOR SECURE MEDIA INDEPENDENT INTERFACE COMMUNICATIONS BY CORRUPTING TRANSMIT DATA ON SELECTED REPEATER PORT

(75) Inventor: William Lo, Cupertino, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 0 days.

(21) Appl. No.: 09/170,221

(22) Filed: Oct. 13, 1998

Related U.S. Application Data

(60) Provisional application No. 60/082,183, filed on Apr. 17, 1998.

(51) Int. Cl.[7] ................................................. H04B 3/36
(52) U.S. Cl. ...................................... 375/211; 370/422
(58) Field of Search ............................... 375/211, 212, 375/213, 214, 215; 370/351, 352, 422

(56) References Cited

U.S. PATENT DOCUMENTS

| | | | | |
|---|---|---|---|---|
| 5,353,353 A | * | 10/1994 | Vijeh et al. | 380/29 |
| 5,850,515 A | * | 12/1998 | Lo et al. | 714/43 |
| 5,850,526 A | * | 12/1998 | Chou | 709/247 |
| 5,935,267 A | * | 8/1999 | Hayakawa | 714/748 |
| 5,940,392 A | * | 8/1999 | Lo et al. | 370/392 |
| 5,958,064 A | * | 9/1999 | Judd et al. | 714/4 |

FOREIGN PATENT DOCUMENTS

| | | | | |
|---|---|---|---|---|
| EP | 0772321 | * | 5/1997 | H04L/12/44 |

* cited by examiner

*Primary Examiner*—Kevin Burd

(57) ABSTRACT

An arrangement for secure repeater communication in an IEEE 802.3 network by transmitting transmit data and a transmit enable signal on a selected repeater port based on an address lookup table in the repeater core. The other repeater ports that do not have a network address corresponding to the destination address of data packet receive corrupted data generated in response to signals from the respective repeater ports. The repeater ports cause generation of corrupted data by concurrently outputting an asserted transmit error signal and an unasserted transmit enable signal on the corresponding media independent interface. A physical layer transceiver, upon detecting the concurrent assertion of the transmit error signal and the deassertion of the transmit enable signal on the media independent interface, selectively outputs a prescribed data pattern as the transmit data to the network node. The prescribed data pattern may also be output to a secondary media independent interface, which receives a modified transmit enable signal. Hence, network nodes receiving the corrupted transmit data interpret the corrupted transmit data as a valid data packet for another network node, as opposed to symbol errors. Hence, network data can be transmitted along secure repeater ports without generation of an artificially high number of symbol errors.

7 Claims, 3 Drawing Sheets

APPARATUS AND METHOD FOR SECURE MEDIA INDEPENDENT INTERFACE COMMUNICATIONS BY CORRUPTING TRANSMIT DATA ON SELECTED REPEATER PORT

CROSS REFERENCE TO RELEATED APPLICATIONS

This application claims priority from Provisional Application No. 60/082,183, filed Apr. 17, 1998, entitled "Quad Fast Ethernet Transceiver for 10 BASE-T/100 BASE-X (QFEX 10/100)."

BACKGROUND OF THE INVENTION

1. Technical Field

The present invention relates to apparatus and methods for providing security in Ethernet-based media independent interface communications.

2. Background Art

Local area networks use a network cable or other network media to link nodes (e.g., workstations, routers and switches) to the network. Each local area network architecture uses a media access control (MAC) enabling a network interface device at each network node to share access to the media.

Physical (PHY) layer devices are configured for translating digital data packet received from a MAC across a standardized interface, e.g. a media independent interface (NM), into an analog signal for transmission on the network medium, and reception of analog signal transmitted from a remote node via the network medium. An example is the 100 BASE-TX IEEE standard 802.3u receiver, configured for receiving a 3-level MLT-3 encoded analog signal at a 125 Mb/s rate.

FIG. 1 is a diagram illustrating a conventional repeater network. The network 10 includes a repeater 12 configured for transmitting a data packet received on an input port to the other ports for reception by the respective network nodes 14. For example, assume that node (i.e., workstation) 14a transmits a data packet via the network medium 16. The transmitted data packet is received by a physical layer transceiver (PHY) 20a which recovers the digital data from the transmitted analog signal. As recognized in the art, the PHY transceiver 20a may be a 100 Base-TX IEEE standard 802.3u receiver, configured for receiving a 3-level MLT-3 encoded analog signal at a 125 Megabit per second rate, and configured for output of the transmit data as nibble-wide (4 bits) or byte-wide transmit data (TXD) to the MII 18 between the PHY 20a and the repeater 12. The repeater 12, upon receiving the transmit data from the PHY transceiver 20a, retransmits the transmit data to all the other ports for transmission by the other PHY transceivers (e.g., 20b, 20c, and 20d). The network stations 14 of the other ports will ignore the packet unless the destination address of the pack's matches the network stations own address. One problem with the arrangement is that any network node can eavesdrop on all packets that are transmitted on the network. Hence, an unauthorized workstation 14e may eavesdrop on all data packets by obtaining access to a repeater port.

Newer repeater architectures have proposed reducing the number of pins on the repeater core by bussing common signals such as the MII transmit data (TXD [3:0]), receiver data (RXD [3:0]), receive clock (RX_CLK), receive data valid (RX_DV), and receive error (RX_ER) signals. These pins can be shared because only one port should be sourcing data at any given time. If more than port sources data then there is a collision, and the actual data that are sourced is a don't-care situation.

The bussing of MII signals, however, further reduces the ability to individually control the data which is transmitted on each port, such that each port of the repeater 12 transmits either valid data when TX_EN is asserted, or does not transmit any data at all. Hence, the unauthorized workstation 14e can more effectively eavesdrop on all data packets by obtaining access to the bussed RXD signal path. Although repeater port access may be somewhat controlled by asserting the transmit enable (TX_EN) signal concurrently with the transmit error (TX_ER) signal, such a proposal generates error symbols despite the presence of valid data. In 100 Mb/s IEEE 802.3 systems, such generation of error symbols may create difficulties in MAC management schemes, since the receiver network node would see an artificially high number of symbol errors. In addition, in 10 Mb/s IEEE 802.3 systems, the TX_ER signal is ignored so that there is no capability to corrupt transmit data in this mode.

SUMMARY OF THE INVENTION

There is a need for an arrangement for secure repeater communications to network nodes by corrupting network data on repeater ports that do not serve the destination network node of a given data packet, without the unnecessary generation of symbol errors.

There is also a need for an arrangement to control transmission of transmit data on individual repeater ports, where data can be corrupted without the transmission of symbol errors.

There is also a need for secure repeater communications that enable transmit data to be corrupted in 10 Mb/s systems for a network station that does not have a network address corresponding to the destination address of a transmitted data packet.

These and other needs are obtained by the present invention, where transmit data is corrupted on a repeater port by the concurrent assertion of a transmit error signal and deassertion of a transmit enable signal on the corresponding media independent interface. The physical layer transceiver, upon detecting the concurrent assertion of the transmit error signal and the deassertion of the transmit enable signal on the media independent interface, selectively outputs a prescribed data pattern as the transmit data to the network node.

According to one aspect of the present invention, a method of corrupting transmit data received from a media independent interface for transmission on a network medium includes detecting an assertion of a transmit error signal on the media independent interface concurrent with a deassertion of a transmit enable signal on the media independent interface, and selectively outputting a prescribed data pattern as the transmit data based on the concurrent detection of the asserted transmit error signal and the deasserted transmit enable signal. The detection of the asserted transmit error signal concurrent with the deasserted enable signal enables a physical layer transceiver to use an undefined condition of IEEE 802.3 protocol to corrupt the transmit data by outputting a prescribed data pattern as the transmit data. Hence, a network node receiving the prescribed data pattern interprets the received prescribed data pattern as a valid data packet for another network node. Hence, the prescribed data pattern provides secure data communications by corrupting transmit data without the generation of error symbols. In addition, the detection of an asserted transmit error signal concurrent with the deasserted transmit enable signal on the media independent interface enables a repeater port and the corresponding physical layer transceiver to utilize an undefined state in IEEE 802.3 networking protocol to corrupt transmit data without adversely affecting otherwise valid networking operations. If desired, the prescribed data pattern may be supplied to another media independent interface, providing full transparency, in the corruption of transmit data on selected ports.

Another aspect of the present invention provides a method of transmitting a data packet received by a repeater from a transmitting network node on a corresponding repeater port. The method includes identifying one of a plurality of repeater ports serving a destination network node based on a destination address in the data packet, transmitting the data packet on one repeater port serving the destination network node by concurrently asserting a transmit enable signal on a corresponding media independent interface, and corrupting transmission on the data packet on the other repeater ports by concurrently asserting a transmit error signal and deasserting the transmit enable signal on the media independent interfaces corresponding to the other repeater ports. Corrupting transmission of the data packet on the other repeater ports enables a network repeater to maintain security by transmitting the data packet as a valid data packet to the one repeater port serving the destination network node while transmitting the transmit data with corrupting control signals on other repeater ports to cause corruption of transmit data. Hence, the network repeater can be configured for transmitting data packets while preventing unauthorized access by an unauthorized network node.

Still another aspect of the present invention provides an apparatus for corrupting transmit data received from a media independent interface for transmission on a network medium. The apparatus includes a detection circuit for detecting a corruption state based on assertion of a transmit error signal on the media independent interface concurrent with the deassertion of a transmit enable signal on the media independent interface. The apparatus also includes an output circuit for selectively outputting a prescribed data pattern as the corrupted transmit data, for transmission on a network medium, based on detection of the corrupting state by the detection circuit. The generation of a prescribed data pattern as the corrupted transmit data enables a receiving network node to interpret the received prescribed data pattern as a valid data packet for another network node, as opposed to generated symbol errors. Moreover, the apparatus may be implemented as a front end of a conventional physical layer transceiver, minimizing modification in existing network implementations.

Yet anther aspect for the present invention provides a repeater system. The repeater system includes repeater ports for communication with respective network nodes via respective media independent interfaces, and a repeater core. The repeater core includes a table for identifying each network node by its corresponding destination address and the corresponding repeater port, and a security circuit. The security circuit is configured for transmitting a data packet on an identified one of the repeater ports corresponding to the network node having the destination address specified in the data packet. The security circuit corrupts transmission of the data packet on other of the network ports by concurrently asserting a transmit error signal and deasserting a transmit enable signal on the respective media independent interfaces. Use of the table enables the repeater core to uniquely identify the repeater port needed to transmit the data packet to the destination network node based on the destination address in the data packet. Moreover, the security circuit enables corruption of the transmitted data packet on other network ports that do not require the data packet. The concurrent assertion of the transmit error signal and deasserted transmit enable signal on the respective media independent interfaces enables a physical layer transceiver to interpret the transmit data as requiring corruption, establishing a unique security protocol between the repeater system and a physical layer transceiver by using an undefined state of existing network protocols.

Additional advantages and novel features of the invention will be set forth in part in the description which follows, and in part will become apparent to those skilled in the art upon examination of the following or may be learned by practice of the invention. The advantages of the invention may be realized and attained by means of the instrumentalities and combinations particularly pointed out in the appended claims.

BRIEF DESCRIPTION OF THE DRAWINGS

Reference is made to the attached drawings, wherein elements having the same reference numeral designations represent like elements throughout and wherein.

BEST MODE FOR CARRYING OUT THE INVENTION

Figure 1:
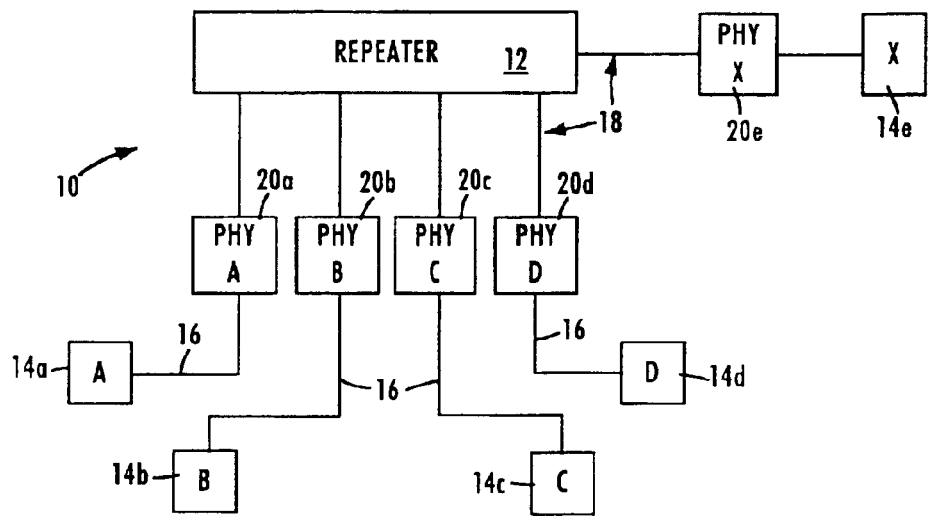
FIG. 1 is a block diagram illustrating a conventional repeater network architecture.
Figure 2:
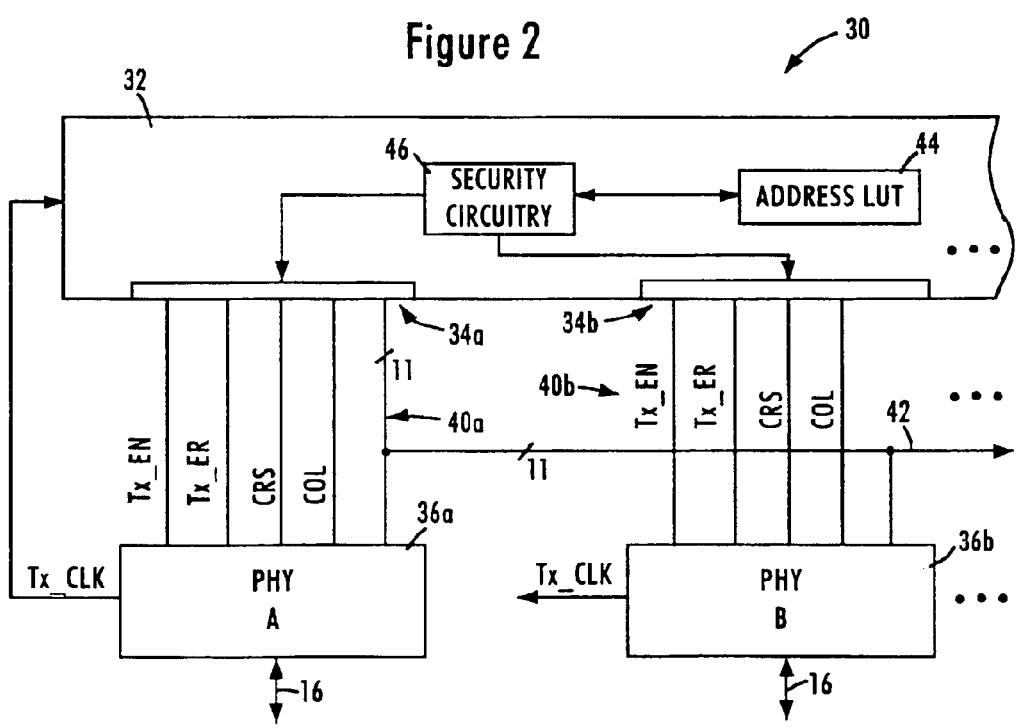
FIG. 2 is a diagram illustrating in detail a repeater system according to an embodiment of the present invention.

FIG. 2 is a block diagram of a repeater system for selectively corrupting transmission of a data packet on selected ports according to an embodiment of the present invention. The repeater system 30 includes a repeater core 32, repeater ports 34, and physical layer transceivers 36. As shown in FIG. 2, the repeater ports 34 are configured for communication with respective network nodes 14 via respective media independent interfaces 40. The media independent interfaces 40 use a shared bus arrangement, where each of the MII's 40 share an 11-bit bus 42 for sharing of the MII transmit data (TXD [3:0]), receive data (RXD [3:0]), receive clock (RX_CLK), receive data valid (RX_DV), and receive error (RX_ER) signals. These signals can be shared because only one port should be sourcing (i.e., transmitting) data on the TXD signal path at any given time. Each MII 40 of the corresponding repeater port 34 also includes dedicated signals, namely transmit enable (TX_EN), transmit error (TX_ER), carrier sense (CRS), collision (COL), and transmit clock (TX_CLK). As described below, the transmit enable and transmit error signals are used to selectively corrupt transmission of the transmit data (TXD) on selected ports 34.

The repeater core 32 includes an address look up table (LUT) 44 and a security circuit 46., The lookup table 44 stores the MAC address (i.e., destination address) of each network node 14 that registers with the repeater 32 (e.g., during autonegotiation), and the corresponding repeater port 34 connecting the network node to the repeater 32. Hence, the repeater core 32 can identify the repeater port corresponding to a network node based on the corresponding MAC address of the destination node.

Hence, upon receiving a data packet from a transmitting network node, the repeater core 32 can determine the output port 34 serving the destination network node by accessing the address look up table 44 based on the destination address in the received data packet. Once the repeater core 32 identifies the repeater port 34 corresponding to the network node having the destination address specified in the data packet, the security circuit transmits the data packet on the identified repeater port by asserting the transmit enable signal (TX_EN) for the corresponding network port concurrently with transmitting the transmit data on the TXD signal path of the shared bus 42.

According to the disclosed embodiment, the security circuit 46 also corrupts transmission of the data packet on other network ports (e.g., 34*b*, etc.) by concurrently asserting the transmit error signal (TX_ER) and deasserting the transmit enable signal (TX_EN) on the respective media independent interfaces 40*b*, etc. Specifically, IEEE 802.3 specifies the following conditions on the MII interface 40, summarized in Table 1.

TABLE 1

| TX_EN | TX_ER | RESULTS |
|---|---|---|
| 0 | 0 | No transmission (no change) |
| 1 | 0 | Transmit data |
| 1 | 1 | Transmit symbol error (100 Mb/s), transmit data (10 Mb/s) |
| 0 | 1 | Undefined |

Hence, IEEE 802.3 specifies the condition TX_EN=0, TX_ER=1 to be an undefined state. The disclosed embodiment uses this state to define a corruption state, where transmit data is corrupted without generation of symbol errors.

Figure 3:
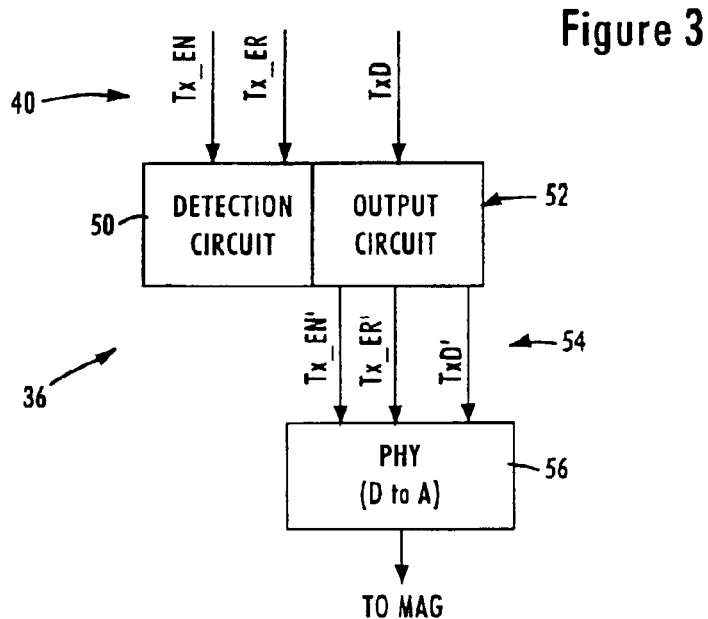
FIG. 3 is a block diagram illustrating in detail the physical layer transceiver of FIG. 2.

Hence, the disclosed embodiment enables a single repeater port (e.g., 34*a*) to provide valid transmit data, wherein the other repeater ports (e.g., 34*b*, etc.) transmit corrupted data by concurrently asserting a transmit error signal and deasserting a transmit enable signal on the A respective media independent interfaces 40. Hence, the repeater core 32 can cause only one repeater port 34 to transmit valid data, whereas the other repeater ports will cause the respective physical layer transceivers 36 to output corrupted data, as described below. Note that the network node transmitting the data packet is not considered one of the "other repeater ports", since the repeater port corresponding to the transmitting network node is receiving the data packet from the network node, FIG. 3 is a block diagram illustrating the physical layer transceivers 36 of FIG. 2 according to an embodiment of the present invention. As shown in FIG. 3, the physical layer transceiver 36 includes a detection circuit 50, an output circuit 52, and a secondary media independent interface 54. The physical layer transceiver 36 may also include a digital-to-analog physical layer transceiver portion 56 configured for generating analog network signals on the network medium 16 based on the signals from the secondary media independent interface 54. The PHY transceiver portion 56 supplies the analog network signals to the corresponding network medium 6 via a magnetic transformer (Mag). As recognized in the art, the physical layer transceiver portion 56 may convert the signals from the secondary media independent interface 54 to MLT-3 encoded signals for 100 Base-TX media, or Manchester-encoded data for 10 Base-T media, or other media specific protocols.

The detection circuit 50 is configured for detecting a corrupting state based on the signals received from the corresponding repeater port 34 via the corresponding media independent interface 40. In particular, the detection 50 receives the port-specific transmit enable (TX_EN) and transmit error (TX_ER) signals and the shared transmit data (TXD) from the MII 40. As described below, the detection circuit 50 detects a corruption state on the MII 40 based on assertion of the transmit error signal (TX_ER) concurrent with deassertion of the transmit enable signal (TX_EN). The output circuit 52 selectively outputs either the supplied transmit data (TXD) or a prescribed data pattern as corrupted transmit data, based upon the detection of the corrupting state by the detection circuit 50. The output circuit 52 is also configured for outputting a modified transmit enable signal (TX_EN') and a modified transmit error signal (TX_ER') to the second media independent interface 54 based on the detected corrupted state by the detection circuit 50.

Figure 4:
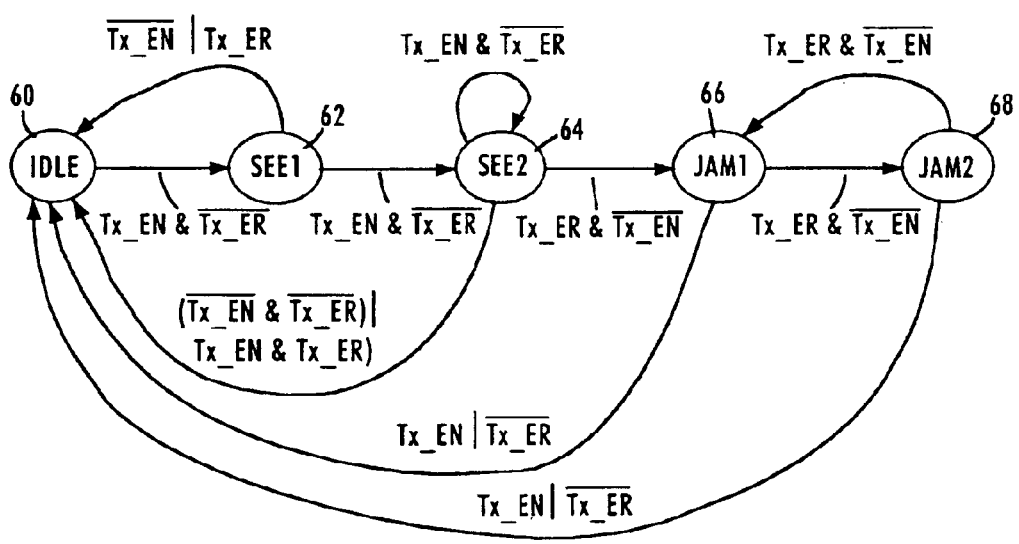
FIG. 4 is a diagram of a state machine implemented in the detection circuit of FIG. 3.

FIG. 4 is a diagram illustrating a state machine executed by the detection circuit 50 for detecting a corrupting state on the corresponding media independent interface 40 according to an embodiment of the present invention. The state diagram of FIG. 4 is illustrative, and assumes that the transmit enable and transmit error signals change states simultaneously. The state machine of FIG. 4 may be modified by requiring that the values of the signals (TX_EN, TX_ER) satisfy a predetermined condition, for example having values of [1,0] respectively for a predetermined number of clock cycles prior to asserting [0,1].

Referring to FIG. 3 and FIG. 4, the state machine and the detection circuit 50 begins in the idle state 60, where the physical layer transceiver 36 receives idle symbols from the corresponding MII 40 and with both the transmit enable and transmit error signals equal to 0. Upon initial transmission of the data packet by the repeater core 32, the security circuitry 46 asserts the transmits enable (TX_EN) signal (TX_N=1) until the entire destination address can be encoded [1,0]. The transmit enable is asserted upon detection of a preamble. The transmit enable signal is asserted on all repeater ports 34 until the destination address (DA) of the data packet can be decoded. In response to detecting assertion of the transmit enable signal (TX_EN=1) and deassertion of the transmit error signal (TX_ER=0), the detection circuit 50 moves from state 60 to state 62 during the next clock cycle. If during state 62 the transmit enable signal is deasserted (TX_EN=0) or transmit error is asserted (TX_ER=1), the detection circuit returns to state 60. However, if the transmit enable signal is asserted concurrent with deassertion of the transmit error signal for another clock cycle, the detection circuit 50 moves to state 64. The detection circuit 50 remains in state 64 until deassertion of both the transmit enable and transmits errors signals [0,0] (e.g., end of transmission), a detected error condition by concurrent assertion of both the transmit enable and transmit errors signals [1,1], or upon detection of a corruption state. The detection circuit 50 detects at state 64 the occurrence of a corruption by the concurrent assertion of the transmit error signal and deassertion of the transmit enable signal, causing the detection circuit 52 to move to the jam 1 state 66.

As shown in FIG. 4, the detection circuit 50 remains in a corruption condition by alternating between state 66 and 68 during assertion of the transmit error signal (TX_ER=1) concurrent with deassertion of the transmit enable signal (TX_EN=0). As described below, the jam 1 state 66 and the jam 2 state 68 are used to drive control signals for generation of the modified signals on the secondary media independent interface 54 by the output circuit 52. If the detection circuit 50 determines during states 66 or 68 that the transmit enable signal is asserted or the transmit error signal is deasserted, the detection circuit 50 returns to state 60.

Hence, the detection circuit 50 requires the detection of a predetermined condition in the transmit error signal and the transmit enable signal in steps 62 and 64, namely a concurrent assertion of the transmit enable signal and deassertion of the transmit error signal for at least a predetermined number of cycles. The corruption condition is detected based on the concurrent detection of the asserted transmit error signal and the deasserted transmit enable signal in state 64 contiguously following the predetermined condition in the transmit enable signal. Hence, use of the predetermined condition for states 62 and 64 minimizes the occurrences of false corruption conditions.

Figure 5:
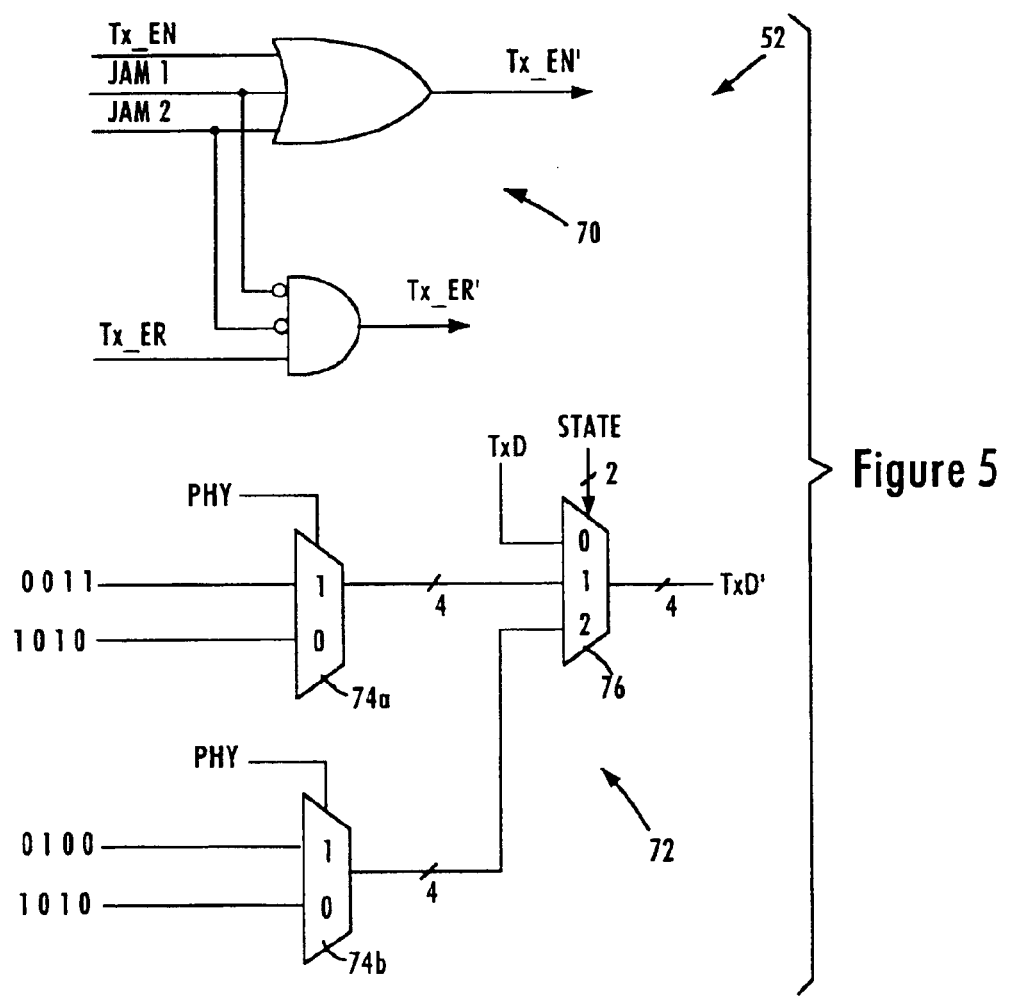
FIG. 5 is a diagram illustrating the output circuit of FIG. 3.

FIG. 5 is a diagram illustrating an exemplary implementation of the output circuit 52. As shown in FIG. 5, the output circuit 52 includes transmit output circuitry 70 for outputting a modified transmit enable signal (TX_EN') and a modified transmit error signal (TX_ER') to the second media independent interface 54 based on the concurrent detection of the asserted transmit error signal and the deasserted transmit enable signal in states 66 and 68. As shown in FIG. 5, the signal jam 1 is asserted when the detection circuit 50 is in state 66, and the signal jam 2 is asserted when the detection circuit is in state 68. Hence, the signals TX_EN and TX_ER are converted back to modified signals in compliance with IEEE 802.3 MII protocol where TX_EN is asserted in either states 66 or 68, or during normal assertion of transmit enable. The modified transmit error signal (TX_ER'), however, is asserted only if the original transmit error signal (TX_ER) is asserted and there is no corruption condition detection in states 66 or 68, indicating a true error condition.

The output circuit 52 also includes a corrupted data generator 72 for generating the modified transmit data signal (TXD') for the second media independent interface 54. The circuit 72 includes multiplexers 74 for generating a prescribed pattern from a plurality of data patterns based on an identified physical layer protocol (PHY) of the network medium, and a second multiplexer 76 for outputting either the transmit data or the prescribed data pattern as the corrupted transmit data based upon detection of the corruption condition in states 66 or 68. In particular, the prescribed pattern is based upon the encoding techniques in the corresponding physical layer protocol that results in output data stream of alternating ones and zeros. Hence, the physical layer protocol having encoding such as 100 base X enables an alternating sequence of '3' (0011) and '4' (0100), which will be later encoded by the physical layer transceiver 56 into a stream of alternating ones and zeros.

The prescribed pattern is supplied to the multiplexer 76, which selectively outputs either the transmit data (TXD), or the prescribed pattern as the corrupted transmit data, based upon the detection states of the detection circuit 50. Specifically, the value 'STATE' is a compilation of the signals jam 2 and jam 1: if jam 1 and jam 2 both equal zero, then STATE equals 0; if jam 1=1 and jam 2=0 then STATE=1; if jam 1=0 and jam 2=1, then STATE equals 2. Hence, the STATE value will equal zero to enable transmission of the transmit data (TXD) to the second MII 54, or will alternate between inputs 1 and 2 of multiplexer 76 each transmit data clock cycle (TX_CLK) to output the prescribed data pattern as the corrupted transmit data.

According to the disclosed embodiment, a repeater system provides security for transmit data on a selected input port by transmitting the transmit data on the selected repeater port and corrupting the transmission on other repeater ports by asserting the transmit error signal concurrent with deassertion of the transmit enable signal on the corresponding media independent interface. The physical layer can then decode the otherwise undefined condition on the media independent interface by selectively outputting a prescribed data pattern instead of the transmit data based on the concurrent detection of the assert transmit error signal and the deasserted transmit enable signal. Hence, network nodes having a destination address different form the transmitted data packet will receive corrupted data that are identified as valid transmitted symbols. Hence, data can be securely transmitted on the network without artificial generation of error symbols on other (i.e., on selected) repeater ports.

Various modifications may be included within the scope of the invention as defined by the appended claims. For example, different prescribed patterns may be used as desired, and alternative predetermined conditions may be established by preceeding the concurrent assertion of the transmit error signal and the deassertion of the transmit enable signal. The use of predetermined conditions preceding the concurrent detection of the asserted transmit error signal and the deasserted transmit enable signal may be varied to improve reliability of detecting the corruption condition.

While this invention has been described in connection with what is presently considered to be the most practical and preferred embodiments, it is to be understood that the invention is not limited to the disclosed embodiments but, on the contrary, is intended to cover various modifications and equivalent arrangements included within the spirit and scope of the appended claims.

What is claimed is:

1. A method of transmitting a data packet received by a repeater from a transmitting network node on a corresponding repeater port, the method comprising:
   identifying one of a plurality of repeater ports serving a destination network node based on a destination address in the data packet;
   transmitting the data packet on the one repeater port serving the destination network node by concurrently asserting a transmit enable signal on a corresponding media independent interface;
   corrupting transmission of the data packet on other repeater ports by concurrently asserting a transmit error signal and deasserting the transmit enable signal on the media independent interfaces corresponding to the other repeater ports;
   receiving by a physical layer transmitter the transmit data, the deasserted transmit enable signal, and the asserted transmit error signal from at least one of the media independent interfaces corresponding to at least one of the other repeater ports; and
   selectively transmitting a prescribed data pattern as corrupted transmit data from the physical layer transmitter to at least one of the network nodes corresponding to the at least one of the other repeater ports based on the received transmit data, the deasserted transmit enable signal, and the asserted transmit error signal.

2. The method of claim 1, wherein the selectively transmitting step includes detecting a predetermined condition in the transmit error signal and the transmit enable signal, the selectively transmitting step outputting the prescribed data pattern in response to the concurrent detection of the asserted transmit error signal and the deasserted transmit enable signal contiguously following the predetermined condition.

3. The method of claim 2, wherein the step of detecting the predetermined condition comprises first detecting, contiguously following an idle state, a concurrent assertion of the transmit enable signal and deassertion of the transmit error signal for at least a first predetermined number of cycles.

4. The method of claim 1, further comprising selecting the predetermined data pattern based on an identified physical layer protocol between the destination network node and the physical layer transmitter.

5. A repeater system comprising:
repeater ports for communication with respective network nodes via respective repeater media independent interfaces;
a repeater core comprising:
(1) a table for identifying each network node by its corresponding destination address and the corresponding repeater port, and
(2) a security circuit for transmitting a data packet on an identified one of the repeater ports corresponding to the network node having the destination address specified in the data packet, the security circuit corrupting transmission of the data packet on other of the repeater ports corresponding to network nodes not having the destination address specified in the data packet by concurrently asserting a transmit error signal and deasserting a transmit enable signal on the respective media independent interfaces; and
at least one physical layer transceiver for receiving the transmitted data packet, the transmit error signal, and the deasserted transmit enable signal for at least one of the media independent interfaces corresponding to the other of the network ports, the physical layer transceiver outputting a prescribed data pattern as a corrupted data packet based on the concurrent assertion of the transmit error signal and the deassertion of the transmit enable signal.

6. The system of claim 5, wherein the physical layer transceiver outputs a modified transmit enable signal, a modified transmit error signal and the corrupted data packet to a second media independent interface for transmission to the corresponding network node based on the concurrent assertion of the transmit error signal and the deassertion of the transmit enable signal.

7. The system of claim 5, wherein the physical layer transceiver includes a detection circuit for detecting a predetermined condition in the transmit error signal and the transmit enable signal, the physical layer transceiver outputting the corrupted data packet in response to the concurrent detection of the asserted transmit error signal and the deasserted transmit enable signal contiguously following the predetermined condition.

* * * * *